March 28, 1939.  E. E. MARTIN  2,152,143
RAISIN CLEANING METHOD
Filed Dec. 15, 1937  2 Sheets-Sheet 1
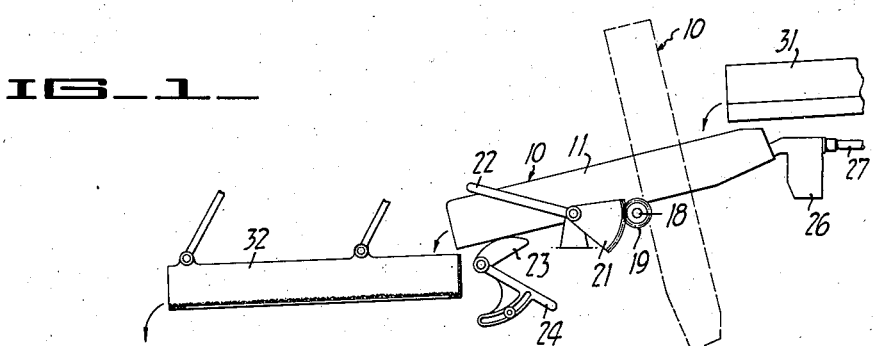
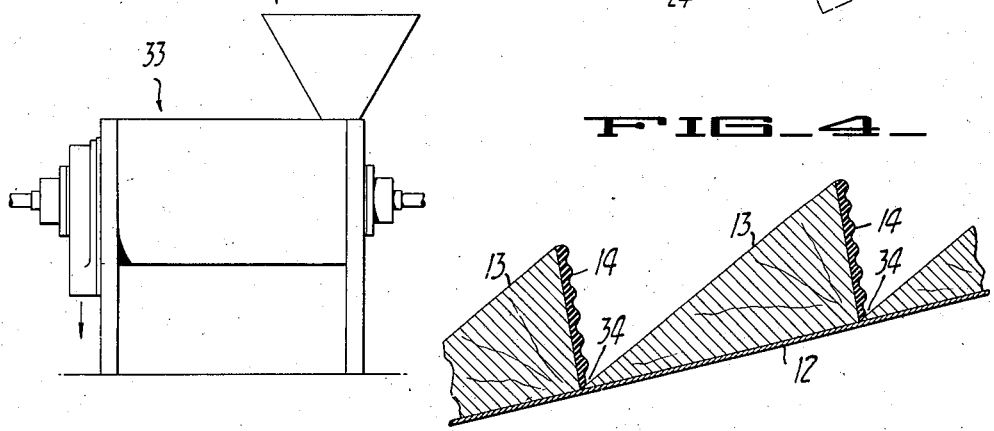
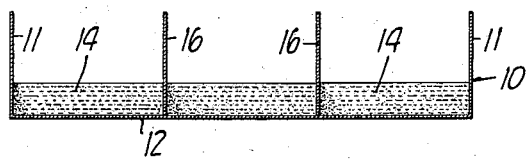
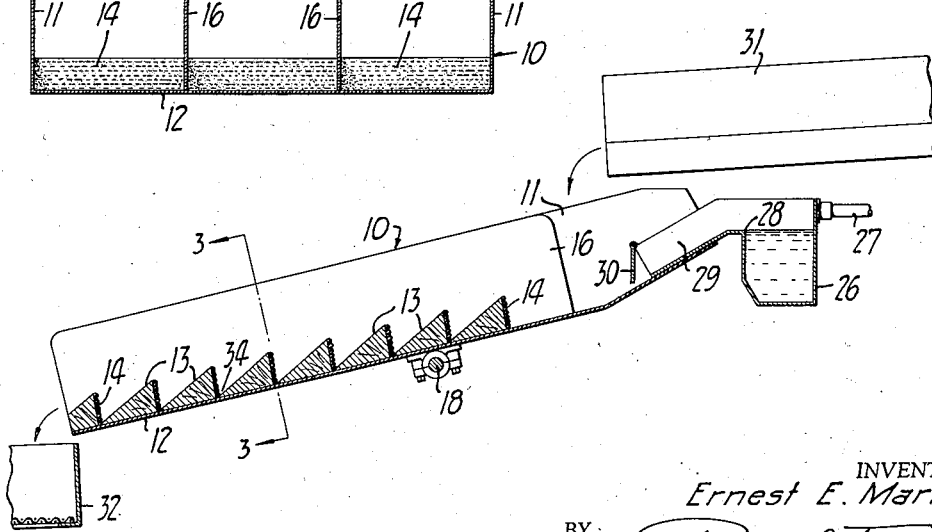
INVENTOR.
Ernest E. Martin
BY
ATTORNEY.

March 28, 1939.  E. E. MARTIN  2,152,143
RAISIN CLEANING METHOD
Filed Dec. 15, 1937  2 Sheets—Sheet 2
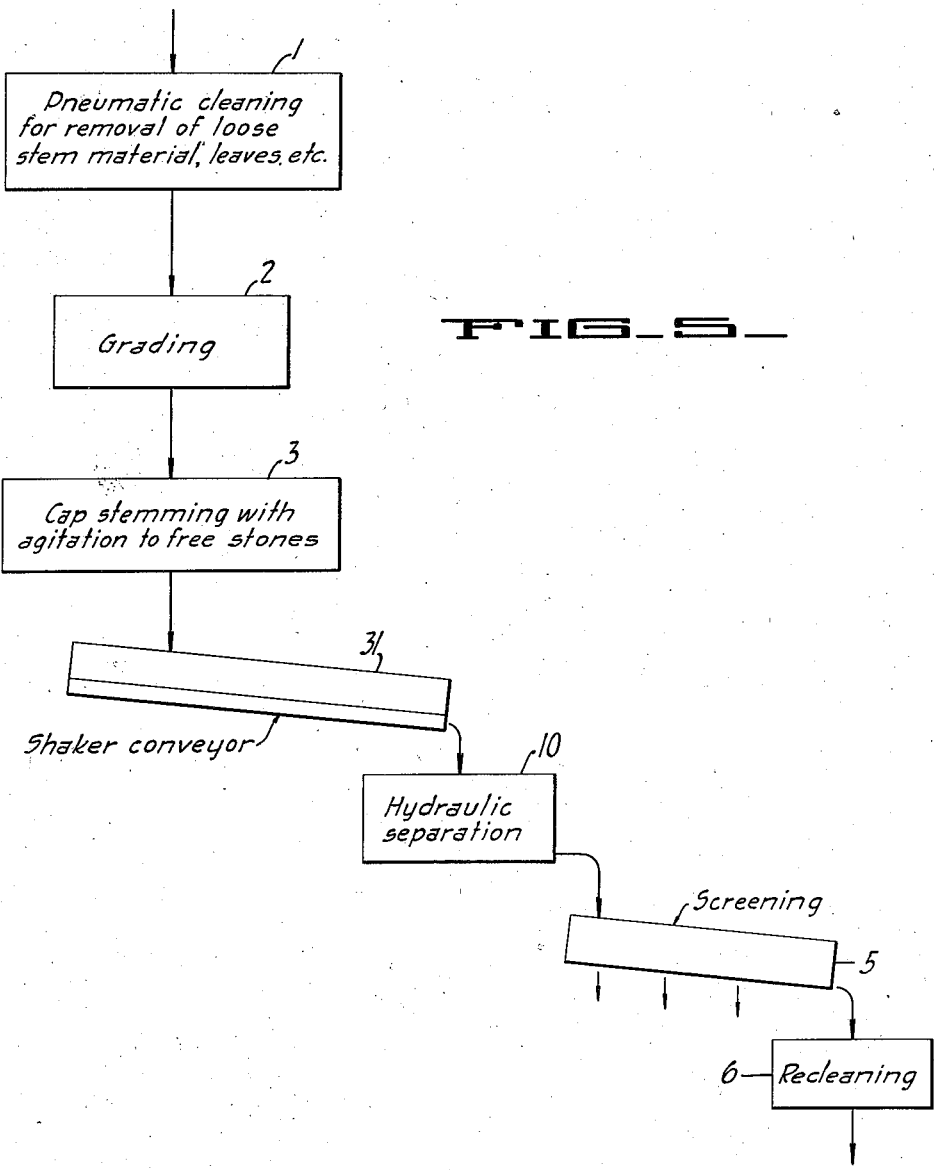
INVENTOR.
Ernest E. Martin
BY
ATTORNEY.

Patented Mar. 28, 1939

2,152,143

UNITED STATES PATENT OFFICE 2,152,143

RAISIN CLEANING METHOD

Ernest E. Martin, Fresno, Calif., assignor to Rosenberg Bros. & Co., San Francisco, Calif., a corporation of California Application December 15, 1937, Serial No. 179,894

2 Claims. (Cl. 209—437)

This invention relates generally to methods and apparatus for the cleaning of partially dehydrated fruit, such as are desirable for use in packing houses for the treatment of raisins prior to packaging the same for distribution or sale.

It is an object of the present invention to provide a method and apparatus of the above character which will be highly effective in removing stones and like foreign particles.

A further object of the invention is to provide for the cleaning of raisins hydraulically, without however, causing an appreciable amount of water to be absorbed by the flesh of the raisins.

Further objects of the invention will appear from the following description in which the preferred embodiment of the invention has been set forth in detail in conjunction with the accompanying drawings.

Referring to the drawings:

Fig. 1 is a side elevational view, illustrating diagrammatically an apparatus incorporating the present invention.

Fig. 2 is a cross section, in side elevation, illustrating a hydraulic riffle such as can be employed in my invention.

Fig. 3 is a cross sectional detail taken along the line 3—3 of Fig. 2.

Fig. 4 is a cross sectional detail, on an enlarged scale, illustrating the manner in which the steps of the hydraulic riffle are preferably constructed.

Fig. 5 illustrates diagrammatically a complete plant system, making use of the apparatus and method described below.

In the past, packing houses have experienced considerable difficulty in effecting proper cleaning of raisins. According to prior prevailing practice, the raisins have been introduced into a perforated drum, and swirled about the interior of the drum by paddles while subjecting the raisins to a spray or stream of water. After leaving the perforated drum or cleaning apparatus, the raisins are then distributed upon a drum or conveyor, and an attempt is made to manually remove stones or like remaining foreign material. Such methods are unsatisfactory not only because of the amount of manual labor involved, but also because it is difficult to distinguish some of the stones and pebbles from the raisins, and thus all of the contaminating material is not removed.

The present invention overcomes the difficulties of prior practice in that the stones and like foreign material are effectively removed, without involving a manual operation, and at the same time the raisins are delivered from the process without having absorbed any detrimental amount of water and in relatively dry condition.

My method can be best understood by first describing the apparatus illustrated in the drawings. Referring to Figure 1, I have shown a riffle structure 10, which can be constructed as illustrated in detail in Figs. 2 to 4 inclusive. Thus this structure is shown provided with side walls 11, and with a bottom wall 12, which can be formed of sheet metal. Disposed upon the bottom wall 12, and extending laterally across the structure 10, are a plurality of steps 13. For a purpose to be presently explained, the up-stream faces of steps 13 are each preferably covered with pads 14 of suitable resilient material, such as soft vulcanized rubber. Likewise the external surfaces of the rubber pads 14, can be corrugated as illustrated. In order to effect proper distribution of the flow of water over steps 13, I preferably provide a plurality of vertical partition walls 16, which can be arranged as illustrated in Fig. 3.

The intermediate portion of structure 10 is shown secured to a shaft 18 which in turn is journaled to a suitable fixed support. To facilitate swinging this structure to different angles with respect to the horizontal, about shaft 18, I have shown a pinion 19 fixed to shaft 18, and engaged by a gear segment 21. Gear segment 21 is journaled to a suitable support, and can be rotated by lever 22. Upon rotating lever 22 it is evident that the angularity of structure 10 will be varied with respect to the horizontal, and that this structure can be swung to a substantially upright position as illustrated in dotted lines in Fig. 1. To fix the position of structure 10 during normal operations, I have shown a cam 23 serving as a stop when structure 10 is swung in a counterclockwise direction, as viewed in Fig. 1. The angularity of cam 23 can be adjusted by lever 24, so that when it is engaged with structure 10, this structure is retained at a predetermined desired angle.

For introducing water into one end of structure 10, I have shown a receptacle 26 adapted to receive a stream of water from pipe 27. Water in receptacle 26 is adapted to flow over a weir 28, to a launder 29, and thence into the upper end of structure 10, as shown in Fig. 2. The discharge of launder 29 can be more effectively distributed across the width of structure 10 by means of a pivoted gate 30. The raisins to be cleaned are arranged to be delivered into the upper end of structure 10, and into the stream of water being discharged from launder 29, by suitable means such as a shaker conveyor 31.

Adjacent the lower discharge end of structure 10, I provide a shaker screen 32, upon which the water and raisins from structure 10 are delivered. The raisins separated from the stream of water by shaker screen 32 are delivered into a secondary cleaning apparatus 33. Apparatus 33 can be of conventional construction, that is, it may consist of a perforated drum, into one end of which the raisins are delivered. Rotating paddles are arranged within the drum, to cause violent agitation and swirling of the raisins. The paddles are so constructed as to cause progression of the raisins to the other end of the drum, where they are delivered.

In operating the above described apparatus in accordance with the present invention, I utilize a relatively large volume of water continuously introduced into the upper end of riffle structure 10, from the launder 29 and raisins are likewise continuously introduced from the conveyor 31. The raisins are immediately caught up by the stream of water flowing over the steps 13, and after a short interval are delivered together with the stream of water, upon screen 32. During passage over the steps 13, stones and like particles substantially heavier than the raisins, are caused to drop out by gravity, and accumulate in the corners 34. While the great majority of the water is immediately separated from the raisins, upon delivery to screen 32, considerable water adhering to the surfaces of the raisins is removed by treatment in the secondary cleaner 33. Likewise secondary cleaner 33 may serve to remove certain additional foreign material having insufficient weight or gravity to separate out in the hydraulic riffle structure. The rubber pads 14 have been found to materially assist in securing efficient separation between the stones and like material, and the raisins. Apparently this is for the reason that when stones strike the rubber pads 14, the rebound is insufficient to cause them to be carried over the top of the steps, and therefore they tend to fall downwardly into the corners 34.

The normal operating angle of structure 10 should of course be adjusted, as by varying the angularity of cam 23, to secure best results. Likewise the amount of water utilized for sluicing the raisins over the riffle should be such as to prevent the permanent retention of raisins in the corners 34, without, however, nullifying proper separating action between the raisins and the heavier stones or like material. Occasionally the structure 10 may be swung to a vertical position to permit the separated stones or other material to drop out by gravity.

It has been found that my method and apparatus is highly effective in the removal of all undesired stones and like material which are difficult to remove by prior practice. It is likewise characteristic of the process that it leaves the raisins with very little water upon their surfaces, and likewise it causes very little absorption of water by the flesh of the raisins, because the treatment while passing through structure 10 is of relatively short duration.

Fig. 5 illustrates diagrammatically a complete plant system, making use of the apparatus and method described above. In this instance the uncleaned raisins, as they are received from the field, are first subjected to a preliminary cleaning 1, which can be pneumatic in its operation, and which serves to remove loose stem material, leaves, paper, and the like. After such preliminary cleaning the raisins are subjected to a grading operation 2, and the material selected for packing, is then supplied to a cap stemming operation 3. This cap stemming operation can make use of conventional equipment, as for example equipment of the type disclosed in Patent No. 639,152 of 1899. In carrying out the operations described the raisins are subjected to considerable agitation, whereby some stones and like fragments adhering to the surfaces of the raisins, are loosened. The raisins are now delivered to the shaker conveyor 31, without intervening storage, and as has been previously disclosed, this conveyor serves to drop sheet-like streams of the raisins into the hydraulic separating apparatus 10. After hydraulic separation, water is removed from the rasins in the screening operation 5 as previously explained, and the raisins can then be subjected to the recleaning operation 6, corresponding to the equipment 33 of Fig. 1.

In the system described it is desirable to have the raisins pass immediately from the cap stemming operation to the shaker conveyor 31, because the cap stemming and pneumatic cleaning operations serve to loosen stones, sand and like heavier material from the surface of the raisins, whereby the raisins are in optimum condition to be subjected to efficient hydraulic separation. Likewise by having hydraulic separation immediately follow the cap stemming operation, the hydraulic separating operation also serves to remove fragments of cap stems adhering to the raisins, which fragments float off upon the water.

This application is in part a continuation of my co-pending application, Serial Number 643,681, filed November 21, 1932, and 650,882, filed January 9, 1933.

I claim:

1. In apparatus of the character described, an inclined riffle structure including a plurality of steps, resilient pads covering the upstream faces of said steps, means for introducing a continuous flow of water into the upper end of said riffle structure, and means for introducing raisins into the stream of water whereby the raisins are sluiced through the riffle structure and heavier foreign material is separated therefrom, the upstream faces of said steps being inclined against the flow of water through said structure.

2. In apparatus for the removal of stones and other foreign material from raisins, an inclined riffle structure including a plurality of steps, means including a weir for introducing longitudinally of the riffle structure and at its upper end a continuous sheet-like stream of water which is of uniform depth throughout the width of the structure, and shaker conveyor means for dropping raisins into the water in a relatively thin stream throughout the width of the riffle structure, along a zone intermediate the uppermost step and said weir, whereby the raisins are immediately caught up and sluiced through the riffle structure and heavy foreign material is separated therefrom, the inclination of the riffle structure and the height of the step being such as to effect the separation of the stones and like foreign material from the raisins by carrying the raisins over the steps rapidly whereby to prevent excessive absorption of moisture by the raisins.

ERNEST E. MARTIN.